United States Patent
Zhang et al.

(10) Patent No.: US 12,342,047 B2
(45) Date of Patent: Jun. 24, 2025

(54) METHOD AND APPARATUS FOR PHOTOGRAPHING LIVE BROADCAST VIDEO, DEVICE AND COMPUTER READABLE STORAGE MEDIUM

(71) Applicant: Beijing Bytedance Network Technology Co., Ltd., Beijing (CN)

(72) Inventors: Tiantian Zhang, Beijing (CN); Wenjing Liu, Beijing (CN); Xuyuan Xiang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/395,435

(22) Filed: Dec. 22, 2023

(65) Prior Publication Data
US 2024/0129585 A1  Apr. 18, 2024

Related U.S. Application Data

(63) Continuation of application No. PCT/CN2022/104880, filed on Jul. 11, 2022.

(30) Foreign Application Priority Data

Jul. 12, 2021 (CN) .......................... 202110786197.6

(51) Int. Cl.
*H04N 23/62* (2023.01)
*H04N 21/2187* (2011.01)
(Continued)

(52) U.S. Cl.
CPC ....... *H04N 21/472* (2013.01); *H04N 21/2187* (2013.01); *H04N 21/266* (2013.01); *H04N 21/44* (2013.01); *H04N 23/631* (2023.01)

(58) Field of Classification Search
CPC ............ H04N 21/472; H04N 21/2187; H04N 21/266; H04N 21/44; H04N 23/631;
(Continued)

(56) References Cited

U.S. PATENT DOCUMENTS 10,250,948 B1   4/2019  Bortz et al.
11,323,653 B1 *  5/2022  Voss ......................... H04N 5/77
(Continued)

FOREIGN PATENT DOCUMENTS

CN    106095217 A    11/2016
CN    106604127 A    4/2017
(Continued)

OTHER PUBLICATIONS

International Search Report issued Oct. 10, 2022 in International Application No. PCT/CN2022/104880, with English translation (7 pages).
(Continued)

*Primary Examiner* — Alazar Tilahun

(57) ABSTRACT

The present disclosure relates to live video photographing method, apparatus, device and computer readable storage medium. During a live video is played in a virtual live room, in response to a trigger for a photograph control, a photograph animation interface is displayed, an image frame of the live video is acquired, and a sharing page corresponding to the image frame is generated, wherein the sharing page comprises an image corresponding to the image frame and at least one sharing manner entry.

14 Claims, 16 Drawing Sheets

(51) Int. Cl.
*H04N 21/266* (2011.01)
*H04N 21/44* (2011.01)
*H04N 21/472* (2011.01)
*H04N 23/63* (2023.01)

(58) Field of Classification Search
CPC ....... H04N 21/23424; H04N 21/25816; H04N 21/26241; H04N 21/4316; H04N 21/4532; H04N 21/4755; H04N 21/4784; H04N 21/4788; H04N 21/4882; H04N 21/812; H04N 21/8545; H04N 21/858; H04L 51/02; G06Q 50/01
See application file for complete search history.

(56) References Cited

U.S. PATENT DOCUMENTS

| | | | |
|---|---|---|---|
| 2013/0093832 A1* | 4/2013 | Konda | H04N 7/155 348/E7.083 |
| 2016/0011758 A1 | 1/2016 | Dornbush et al. | |
| 2016/0210013 A1* | 7/2016 | Park | G06F 3/0412 |
| 2017/0235444 A1* | 8/2017 | Zhang | G06F 16/9577 715/758 |
| 2018/0091728 A1* | 3/2018 | Brown | H04N 5/91 |
| 2019/0075340 A1 | 3/2019 | Hochart | |
| 2019/0082215 A1 | 3/2019 | Horiguchi | |
| 2019/0281327 A1* | 9/2019 | Li | H04N 21/2393 |
| 2020/0382724 A1* | 12/2020 | Pena | G06F 3/04883 |
| 2021/0006867 A1* | 1/2021 | Liu | H04N 21/4316 |
| 2021/0023449 A1* | 1/2021 | Wu | A63F 13/67 |
| 2021/0227177 A1* | 7/2021 | Shah | H04N 7/155 |
| 2022/0206645 A1* | 6/2022 | Zadina | H04N 21/4316 |

FOREIGN PATENT DOCUMENTS

| | | |
|---|---|---|
| CN | 106648424 A | 5/2017 |
| CN | 108259973 A | 7/2018 |
| CN | 110020389 A | 7/2019 |
| CN | 110049343 A | 7/2019 |
| CN | 110602565 A | 12/2019 |
| CN | 110743163 A | 2/2020 |
| CN | 111147788 A | 5/2020 |
| CN | 111158576 A | 5/2020 |
| CN | 111479129 A | 7/2020 |
| CN | 111610905 A | 9/2020 |
| CN | 112104883 A | 12/2020 |
| CN | 112492330 A | 3/2021 |
| EP | 3547697 A1 | 10/2019 |
| EP | 3731531 A1 | 10/2020 |
| JP | 2017-152841 A1 | 8/2017 |
| JP | 2020-504488 A | 2/2020 |
| TW | 201935931 A | 9/2019 |

OTHER PUBLICATIONS

European Search Report for EP Patent Application No. 22841309.2, Issued on Jun. 21, 2024, 6 pages.
Notice of Grant of Patent Right for invention from Chinese patent application No. 202110786197.6 mailed on Jul. 22, 2024, 10 pages (5 pages English Translation and 5 pages Original Copy).
"How can I share Net Ease cloud songs in the circle of friends with this effect?", Zhihu, 2022, pp. 1-10.
Office action received from Chinese patent application No. 202110786197.6 mailed on Dec. 26, 2023, 16 pages (8 pages English Translation and 8 pages Original Copy).
"Line Live", Live steaming.net, Jun. 10, 2019, pp. 1-13.
"Twitter Fleet", Life, Nov. 15, 2020, pp. 1-24.
Office action received from Japanese patent application No. 2023-579257 mailed on Feb. 4, 2025, 9 pages (5 pages English Translation and 4 pages Original Copy).
Makkabaka's Little Dots: "How Can I Share NetEase Cloud Songs in Moments to Achieve this Effect?,", pp. 1-5, Retrieved from URL: https://www.zhihu.com/question/382238324/answer/1192457775.
Written Opinion for International Application No. PCT/US2022/104880, mailed Oct. 10, 2022, 07 Pages.

* cited by examiner

METHOD AND APPARATUS FOR PHOTOGRAPHING LIVE BROADCAST VIDEO, DEVICE AND COMPUTER READABLE STORAGE MEDIUM

CROSS-REFERENCE OF RELATED APPLICATION

This application is a continuation of International Application No. PCT/CN2022/104880, filed on Jul. 11, 2022, which is based on and claims the benefit of China Patent Application No. 202110786197.6 filed on Jul. 12, 2021 with the application name "Method, apparatus, device for live video photographing and computer-readable storage medium", both of the aforementioned applications are hereby incorporated by reference in their entireties.

FIELD OF THE INVENTION

The present disclosure relates to the technical field of computer communication technology, in particular to method, apparatus, device for live video photographing and computer-readable storage medium.

BACKGROUND

In the process of playing live video in a virtual live room, a user will photograph and share the video played in the virtual live room. However, at present, the sharing is mainly achieved through screenshots, which can not meet requirements of some users and thereby affect the user's usage experience.

DISCLOSURE OF THE INVENTION

In order to solve or at least partially solve the above technical problems, the present disclosure provides a method, apparatus, device for live video photographing and computer-readable storage medium.

In a first aspect of the present disclosure, there is provided a live video photographing method, which includes:
  during a live video is played in a virtual live room, in response to a trigger for a photograph control, displaying a photograph animation interface, acquiring an image frame of the live video,
  generating a sharing page corresponding to the image frame, wherein the sharing page includes a screenshot of the image frame and at least one sharing manner entry.

Optionally, before in response to a trigger for a photograph control, displaying a photograph animation interface, acquiring an image frame of the live video, the method further includes:
  in response to a trigger for a target interactive button displayed on the live video interface, displaying an interactive interface, wherein the interactive interface displays the photograph control.

Optionally, when interactive data of the live video meets a preset condition, the photograph control displayed on the interactive interface is in a triggerable state.

Optionally, the photograph control is displayed on the live video interface.

Optionally, the sharing page further includes:
a copy matching box and selection control;
The method further includes:
in response to the trigger for the selection control, displaying a target preset copy in the copy matching box, and displaying the target preset copy at a preset position with respect to the screenshot of the image frame in a preset font.

Optionally, the sharing page further includes:
a copy matching box and a switching control;
The method further includes:
in response to a trigger for the switching control, switching a target preset copy in the copy matching box, and displaying the target preset copy at a preset position with respect to the screenshot of the image frame in a preset font.

Optionally, the sharing page also displays a two-dimensional code, which corresponds to the virtual live room, so that other users can enter the virtual live room by scanning the two-dimensional code.

Optionally, after generating the sharing page corresponding to the image frame, the method further includes:
in response to a trigger for a target sharing manner entry in the at least one sharing manner entry, sharing the screenshot of the image frame through the target sharing manner.

In a second aspect, an embodiment of the present disclosure provides a live video photographing apparatus, including:
  an acquisition module, configured to during a live video is played in a virtual live room, in response to a trigger for a photograph control, display a photograph animation interface, acquire an image frame of the live video,
  a sharing page generation module configured to generate a sharing page corresponding to the image frame, wherein the sharing page includes a screenshot of the image frame and at least one sharing manner entry.

Optionally, the live video photographing apparatus further includes: an interactive interface display trigger module configured to, in response to a trigger for a target interactive button displayed on the live video interface, display an interactive interface, wherein the interactive interface displays the photograph control.

Optionally, when interactive data of the virtual live video meets a preset condition, the photograph control displayed on the interactive interface is in a triggerable state.

Optionally, the photograph control is displayed on the live video interface.

Optionally, the sharing page further includes: a copy matching box and selection control;
The live video photographing apparatus further includes a selection control trigger module configured to, in response to the trigger for the selection control, display a target preset copy in the copy matching box, and display the target preset copy at a preset position with respect to the screenshot of the image frame in a preset font.

Optionally, the sharing page further includes: a copy matching box and a switching control;
The live video photographing apparatus further includes a switching control trigger module configured to, in response to a trigger for the switching control, switch a target preset copy in the copy matching box, and display the target preset copy at a preset position with respect to the screenshot of the image frame in a preset font.

Optionally, the sharing page also displays a two-dimensional code, which corresponds to the virtual live room, so that other users can enter the virtual live room by scanning the two-dimensional code.

Optionally, the live video photographing apparatus further includes a target sharing manner trigger module configured to, in response to a trigger for a target sharing manner entry in the at least one sharing manner entry, share the screenshot of the image frame through the target sharing manner.

In a third aspect, an embodiment of the present disclosure provides an electronic device, comprising a processor for executing a computer program stored in a memory, wherein the computer program, when executed by the processor, causes implementation of steps of the method described in any one of the first aspects.

In a fourth aspect, an embodiment of the present disclosure provides a computer-readable storage medium on which a computer program is stored, wherein the computer program, when executed by a processor, causes implementation of steps of the method described in any one of the first aspects.

DESCRIPTION OF THE DRAWINGS

The accompanying drawings, which are incorporated in and constitute a part of this specification, illustrate embodiments consistent with the disclosure and together with the description, serve to explain the principles of the disclosure.

In order to more clearly explain the technical scheme in the embodiment of the present disclosure or the related technology, the drawings needed in the description of the embodiments or the prior art will be briefly introduced below. Obviously, for ordinary people in the field, other drawings can be obtained according to these drawings without paying creative labor.

DETAILED DESCRIPTION OF PREFERRED EMBODIMENTS

Figure 1:
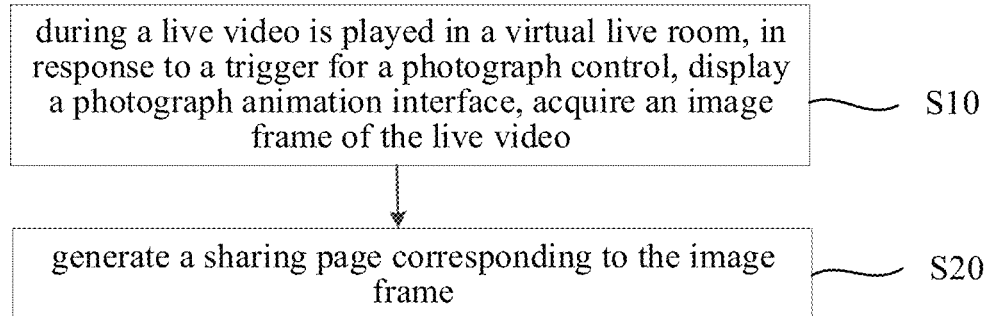
FIG. 1 is a flow diagram of a live video photographing method provided by the present disclosure.

In order to understand the above objects, features and advantages of the present disclosure more clearly, the scheme of the present disclosure will be further described below. It should be noted that the embodiments of the present disclosure and the features in the embodiments can be combined with each other without conflict.

In the following description, many specific details are set forth in order to fully understand the present disclosure, but the present disclosure may be practiced in other ways than those described herein; obviously, the embodiments in the specification are only part of the embodiments of the present disclosure, not all of them.

The technical scheme disclosed by the present disclosure can be applied to an electronic device, wherein the electronic device can be a computer, a tablet, a mobile phone or other intelligent terminal equipment. The electronic device has a display screen, wherein the display screen can be a touch screen or a non-touch screen, for the electronic device with a touch screen, the user can interact with the electronic device through gestures, fingers or touch tools (for example, a stylus). For the electronic equipment with a non-touch screen, the interactive operation with the electronic device can be realized through an external equipment (such as mouse, keyboard or camera).

In this disclosure, the type of operating system for the electronic device is not limited, and for example, can be Android system, Linux system, Windows system, iOS system and so on.

At present, in order to share contents of the virtual live room, in the process of playing live video in the virtual live room in related technologies, users take screenshots of the live video played in the virtual live room through the screen acquisition function of the terminal equipment, save the acquired pictures to the photo album, and share the screenshots by accessing the photo album through other applications. However, the acquired photos include not only the live video interface, but also interactive pictures and other elements, so the photographed picture subject is not prominent and the live event has low interesting.

Based on this, the present disclosure provides a live video photographing method, specifically, the electronic device of the present disclosure is installed with a live Application (APP), and by triggering a photograph control in the virtual live room of the live APP, an image frame of the live video can be acquired during the live video playing in the virtual live room, and the image frame does not include an interactive interface and other elements, so that the photographed picture subject is prominent. Through the sharing manner of displaying in the APP, the photographed pictures can be shared directly, and the sharing efficiency can be improved. In addition, in the process of acquiring the image frame of the live video, the user can trigger the photograph control to display a photograph animation interface, which enhances the ritual sense of the photograph behavior and improves the interest of the live interaction.

The technical scheme of the present disclosure can be applied to an interactive scenario in the virtual live room, and the following embodiment will be described by taking the scenario of the virtual live room as an example.

The following describes the technical scheme of the present disclosure with several specific embodiments:

FIG. 1 is a flow diagram of a live video photographing method provided by the present disclosure. As shown in FIG. 1, the method of this embodiment is as follows:

S10. During a live video is played in a virtual live room, in response to a trigger for a photograph control, displaying a photograph animation interface, acquiring an image frame of the live video.

A virtual live room refers to a live room turned on by different users on the live APP, for example, XX concert live room, XXX wear live room and so on. The virtual live room playing the live video refers to the live video played in a virtual live room after entering it, for example, the concert live video in XX concert live room, the wear live video in XXX wear live room.

The virtual live room according to the present disclosure can realize the photographing function, and can achieve the photographing by triggering a photograph control, wherein the photograph control can be displayed on a live video interface, and the photograph control can also be displayed on an interface displayed by triggering other controls, which is not limited by the disclosure.

Among them, the photograph control can be a button with a camera pattern, or a voice control capable of photographing in response, or a gesture control capable of photographing in response, etc., which is not limited by the present disclosure.

Figure 2:
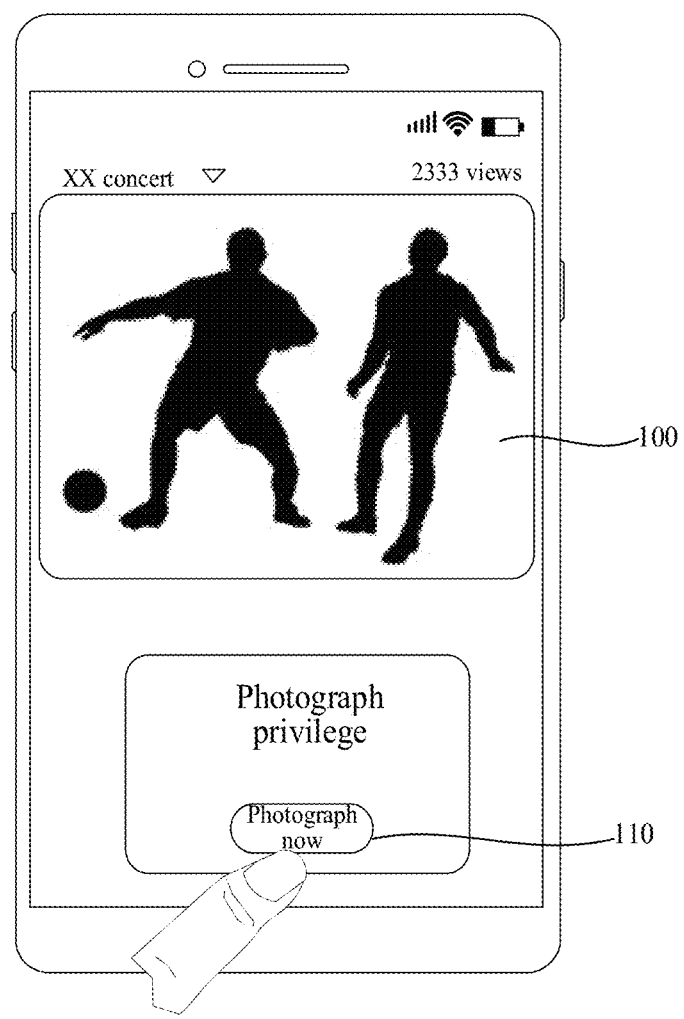
FIG. 2 is a schematic diagram of a display interface provided by the present disclosure.
Figure 3:
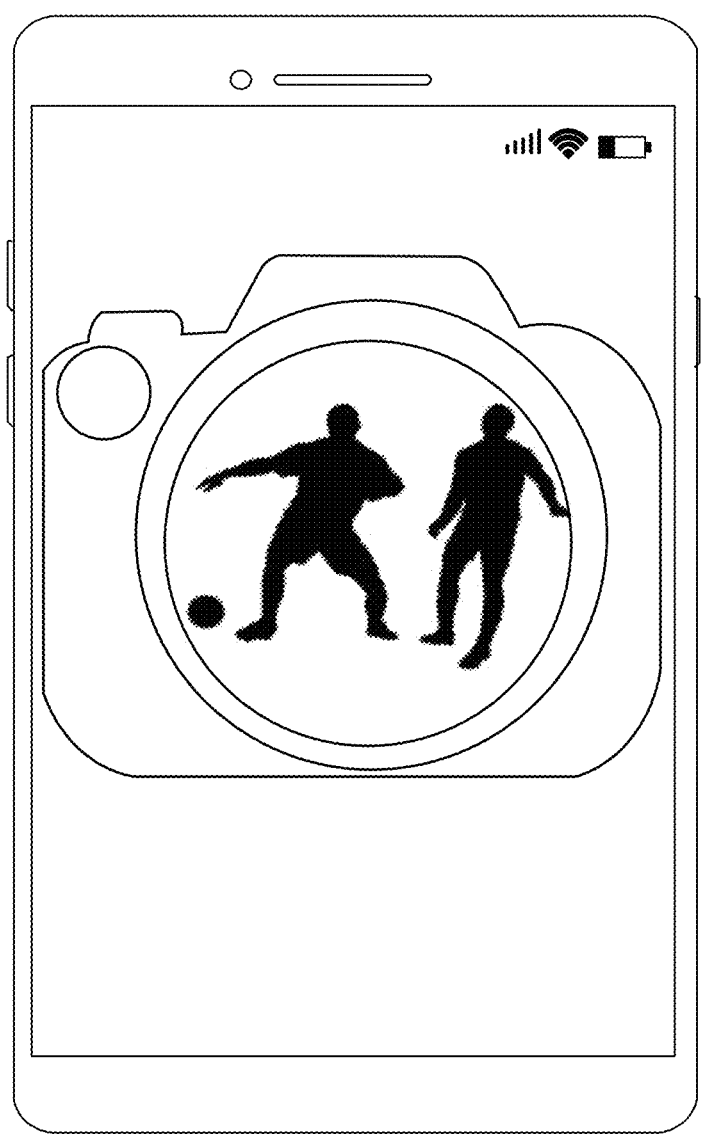
FIG. 3 is a schematic diagram of another display interface provided by the present disclosure.

Taking the button with camera pattern as an example, the user enters the XX concert live room, and the virtual live room plays the live video 100 of XX concert. As shown in FIG. 2, the photograph control 110 is displayed on the live video interface, and after the user triggers the photograph control 110, a photograph animation interface is displayed, wherein the photograph animation interface displays image frames and animation effects of the live video, where the animation effects may include, but not limited to, sound effects and/or visual features, for example, it can be an instant animation when a user presses the camera shutter accompanied by the "click-clack" sound effect, as shown in FIG. 3. It can also be other special effects, such as fireworks special effects or cheering special effects, the image frame of live video can be acquired while the photograph animation interface of fireworks special effects is displayed in the virtual live room, wherein the acquired image frame of live video is a current image frame played in the virtual live room corresponding to the trigger for the photo control.

Figure 4:
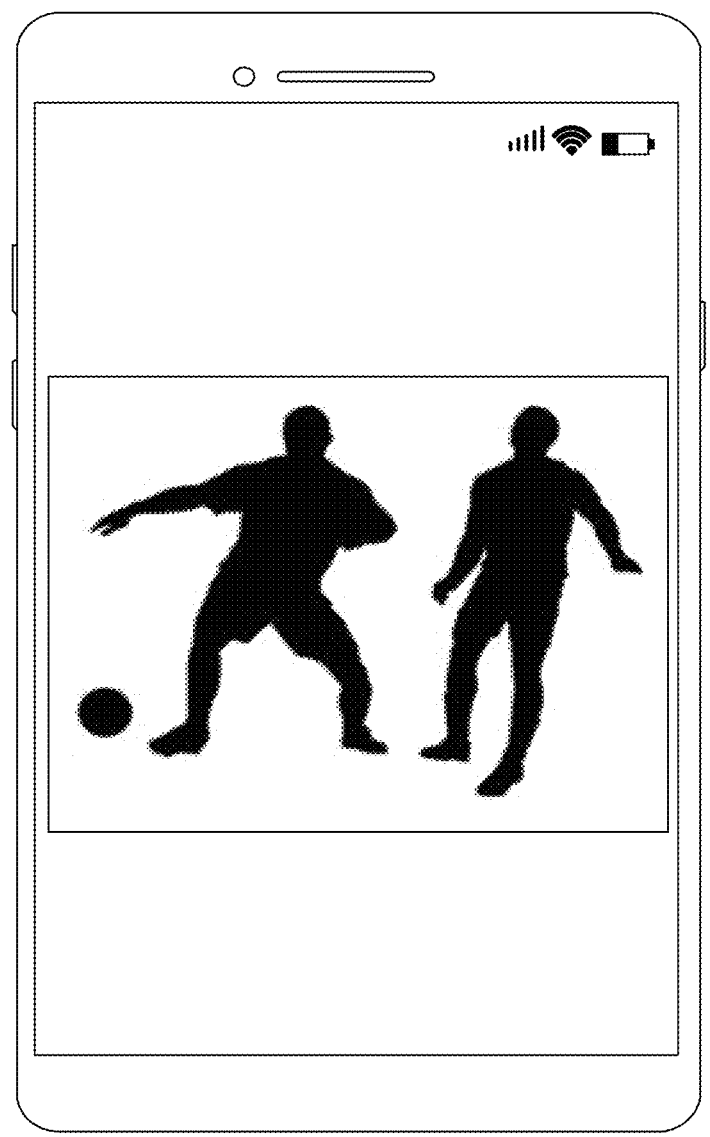
FIG. 4 is a schematic diagram of another display interface provided by the present disclosure.

For example, the acquired image frame of the live video is as shown in FIG. 4, and a live picture corresponding to the live video can be acquired when the XX concert live room displays an instant animation when the shutter is being pressed for photographing accompanied by the sound effect of "click" when taking a photo.

S20, generating a sharing page corresponding to the image frame.

Where, the sharing page 200 may include a screenshot 210 of the image frame and at least one sharing manner entry 220.

Figure 5:
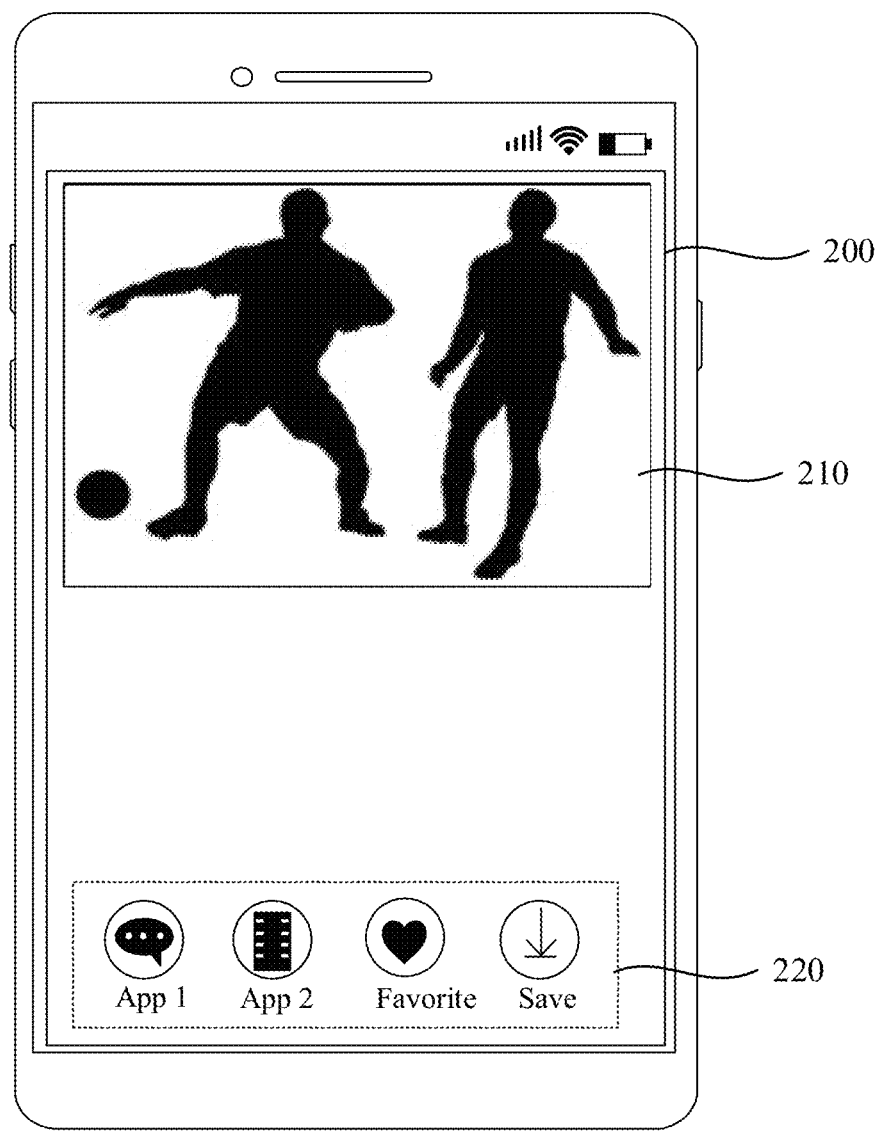
FIG. 5 is a schematic diagram of another display interface provided by the present disclosure.

Specifically, after acquiring the image frame of live video, a sharing page 200 corresponding to the image frame is generated, for example, as shown in FIG. 5, referring to FIG. 5, the sharing page 200 includes the screenshot 210 of the image frame and at least one sharing manner entry 220, wherein the screenshot 210 of the image frame is only the live video picture played in the virtual live room, excluding interactive messages, interactive special effects and so on in the virtual live room, and the sharing manner entry 220 can be, for example, sharing to the application 1, sharing to the application 2, favorite collection, saved in a local album, and so on. For example, sharing to application 1 can mean sharing to friends corresponding to application 1 through the application 1, or published to a social circle corresponding to application 1 through application 1, and sharing to application 2 can mean sharing to friends corresponding to application 2 through the application 2, or published to a social circle corresponding to application 2 through application 2, favorite collection can mean saved in a collection column of the application corresponding to the virtual live room by clicking the collection button, and saved in a local album can mean downloading and saving.

In the live video photographing method provided by the embodiment of the present disclosure, during a live video is played in a virtual live room, in response to a trigger for a photograph control, a photograph animation interface is displayed, an image frame of the live video is acquired, and a sharing page corresponding to the image frame is generated. During a live video is played in a virtual live room, an image frame of the live video is acquired, that is, the acquired image frame of the live video is only the live video picture played in the virtual live room, excluding interactive messages, other elements, etc., and the acquired live video picture directly highlights the contents played in the live room, and displaying the photograph animation interface after the photograph control is triggered can improve the user's perception of the photographing process in the virtual live room, enhance the ritual sense of photographing behavior, improve the interest of live interaction, enrich the manners of video photographing in the virtual live room, and directly displaying the sharing page after photographing is convenient for users to share with other users through sharing manners, improve the efficiency and convenience of sharing, and further improve the user's experience.

Figure 6:
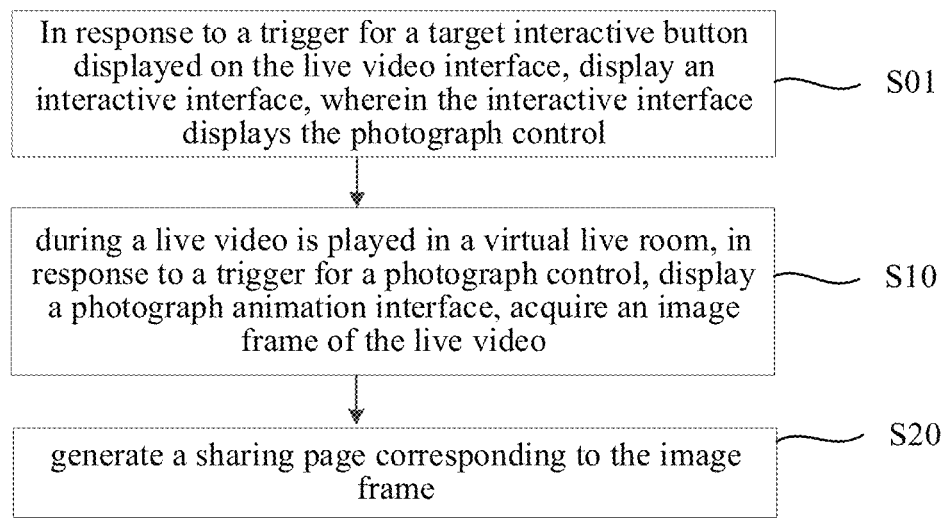
FIG. 6 is a flow diagram of another live video photographing method provided by the present disclosure.

FIG. 6 is a flow diagram of another live video photographing method provided by an embodiment of the present disclosure, on the basis of the above embodiments, as shown in FIG. 6, before step S10, it further includes:

S01. In response to a trigger for a target interactive button displayed on the live video interface, displaying an interactive interface, wherein the interactive interface displays the photograph control.

Figure 7:
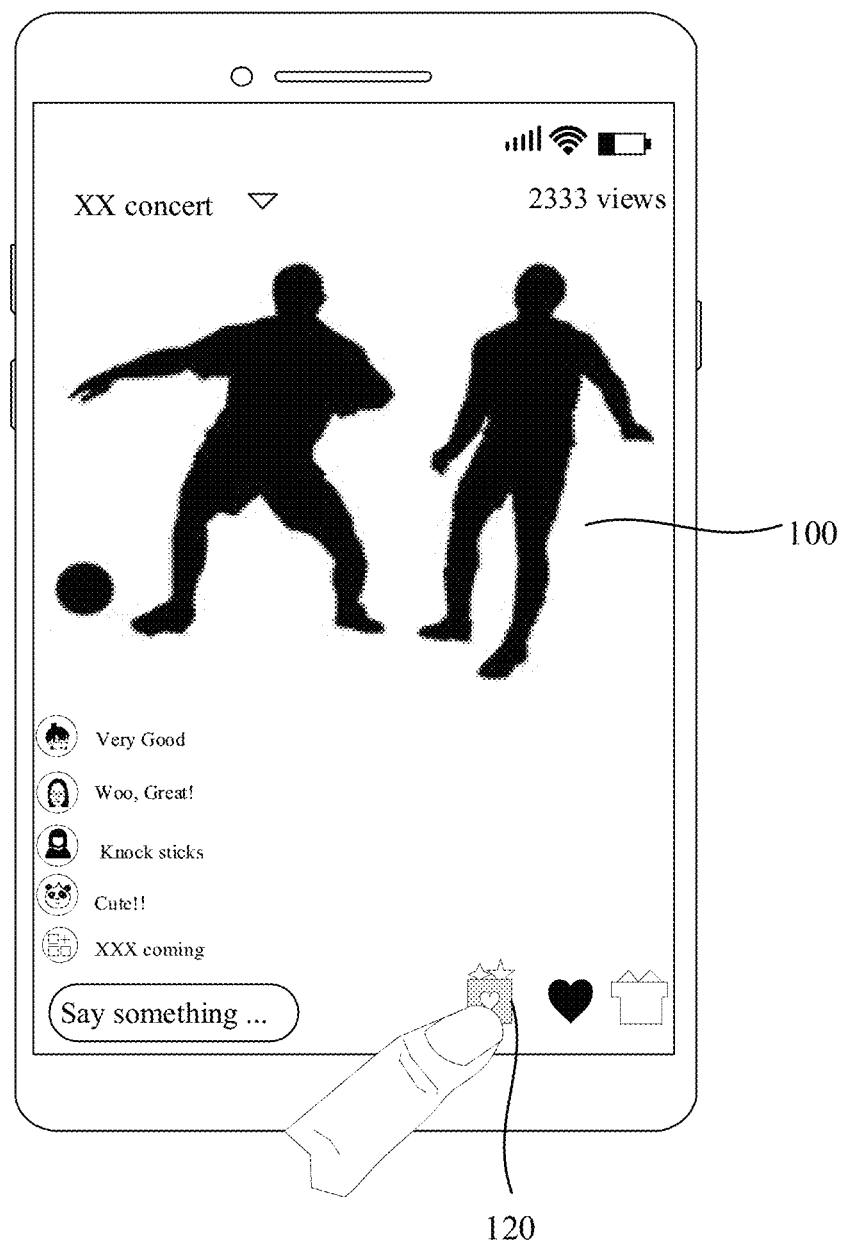
FIG. 7 is a schematic diagram of another display interface provided by the present disclosure.

The target interactive button can be, for example, a photographing privilege button in the live video interface. As shown in FIG. 7, when the user triggers the target interactive button 120 in the live video interface, the interactive interface of the virtual live room can be switched from the corresponding interactive interface in FIG. 7 to the corresponding interactive interface in FIG. 2, that is, after the user clicks the target interactive button 120 in the interactive interface in FIG. 7, the corresponding interactive interface in FIG. 2 is displayed, and the interactive interface in FIG. 2 displays the photograph control 110, and when the photograph control 110 on the interactive interface in FIG. 2 is triggered, a photograph animation interface can be displayed, and an image frame of the live video can be acquired, so that a sharing page corresponding to the image fame can be generated.

It should be noted that FIG. 7 shows the target interactive button 120 in an exemplary manner, while the shape, structure and the like of the target interactive button 120 are not specifically limited in the embodiment of the present invention, and the trigger mode for the target interactive button 120 is not specifically limited in the embodiment of the present invention.

In addition, the target interactive button 120 belongs to a kind of right that each user who has purchased the virtual electronic ticket corresponding to the virtual live room can use, and a user can also obtain the right to use the target interactive button if the user's interaction in the virtual live room reaches a target value or the user can obtain the privilege through operational activities.

The live video photographing method provided by the embodiment of the present disclosure triggers the target interactive button displayed in the live video interface, and displays the interactive interface after the target interactive button in the live video interface is triggered, the interactive interface displays a photograph control, so that after the target interactive button is triggered in the live video interface of the virtual live room, the user can switch to the interactive interface containing the photograph control, and the interest of the user photographing in the virtual live room can be increased.

Optionally, when interactive data of the virtual live video meets a preset condition, the photograph control displayed on the interactive interface is in a triggerable state.

Figure 8:
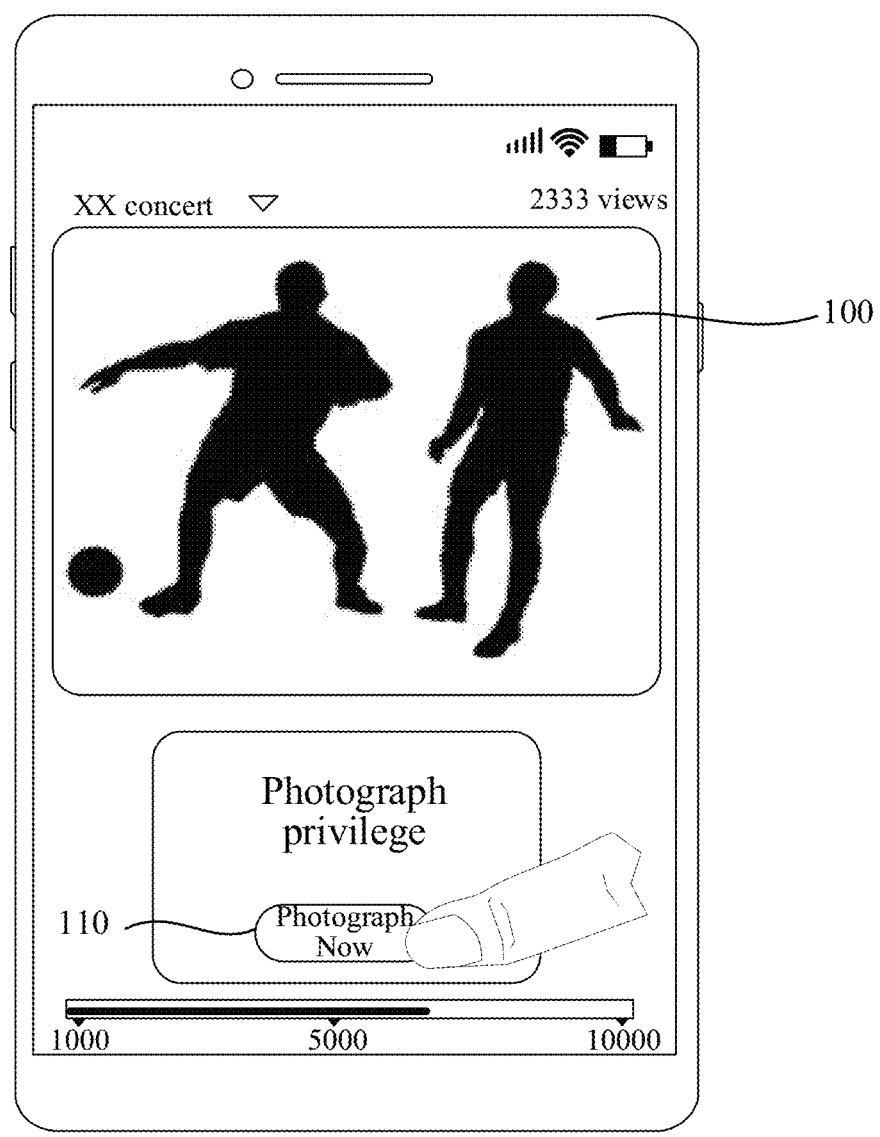
FIG. 8 is a schematic diagram of another display interface provided by the present disclosure.
Figure 9:
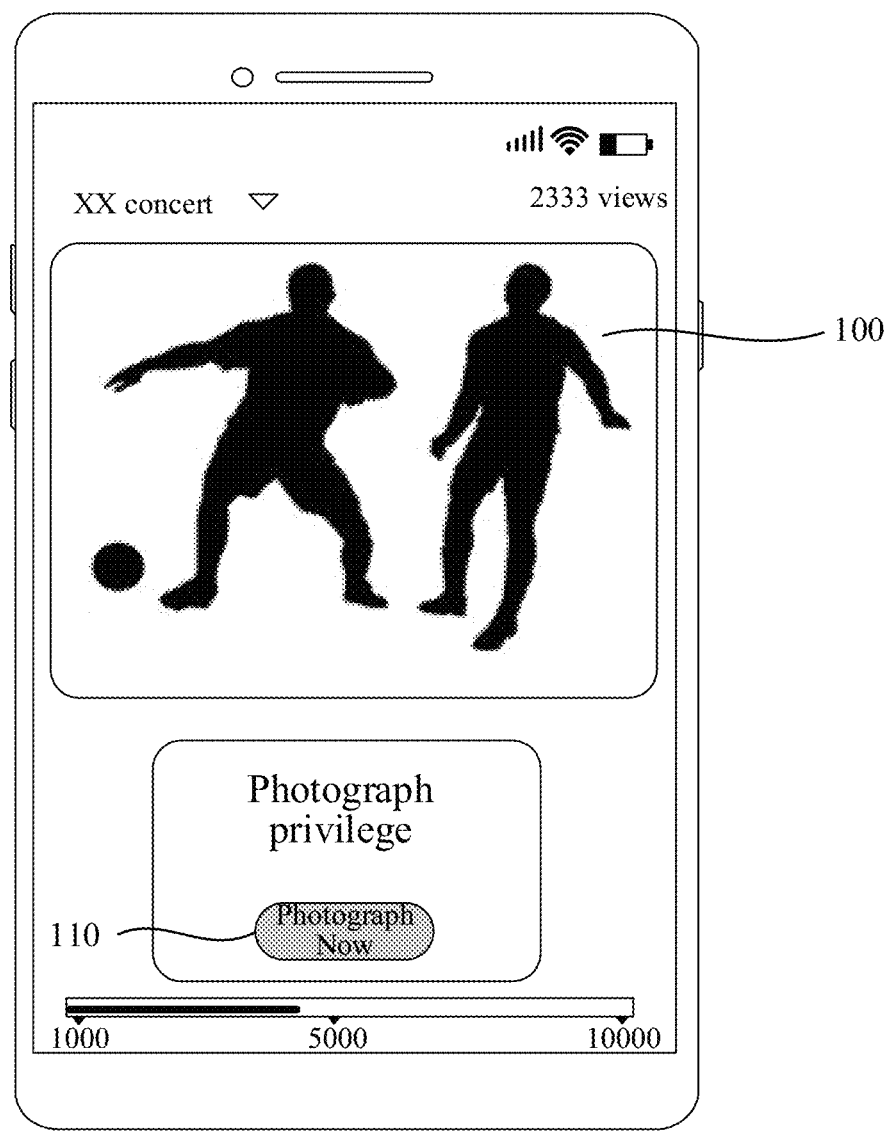
FIG. 9 is a schematic diagram of another display interface provided by the present disclosure.

The interactive data of the virtual live video refers to likes data, message data, gift data, etc. in the process of playing live video in the virtual live room, when the interactive data of the virtual live video meets a preset condition, the photograph control displayed on the interactive interface can be in a triggerable state. For example, as shown in FIG. 8, when the user's likes data in the virtual live video meet 5000 likes, the photograph control 110 displayed on the interactive interface is in a triggerable state, that is, after the user triggers the photograph control 110, the photographing animation interface can be displayed and an image frame of the live video can be acquired. However, when the user's like data in the virtual live video does not meet 5000 likes, the photograph control 110 displayed on the interactive interface is in an untriggerable state, as shown in FIG. 9, that is, even the photograph control 110 is triggered and clicked, the photograph control 110 is in an untriggerable state, and the photograph animation interface will not be displayed.

Figure 10:
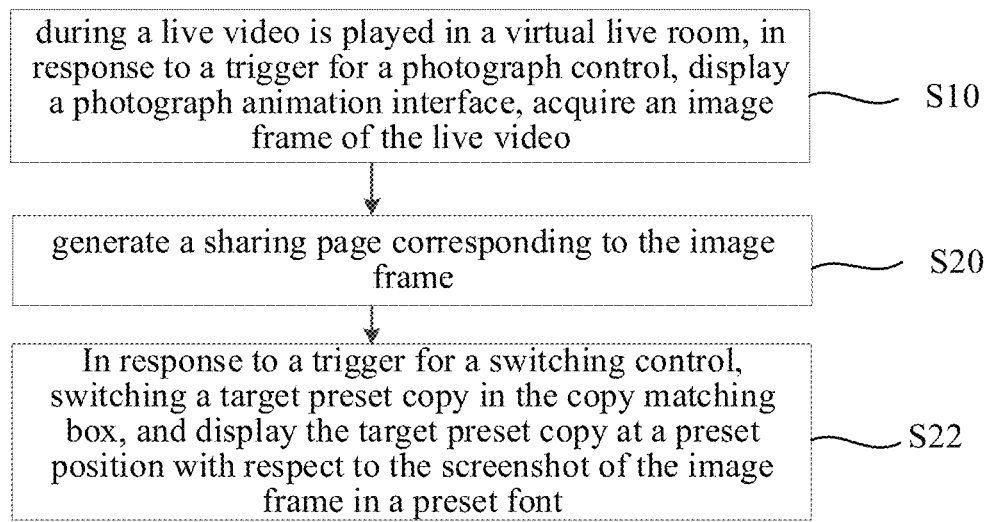
FIG. 10 is a flow diagram of yet a live video photographing method provided by the present disclosure.

FIG. 10 is a flow diagram of another live video photographing method provided an embodiment of the present disclosure, on the basis of the above embodiments, as shown in FIG. 10, the live video photographing method further includes:

S21. In response to a trigger for a switching control, switching a target preset copy in a copy matching box, and displaying the target preset copy at a preset position with respect to the screenshot of the image frame in a preset font.

Figure 11:
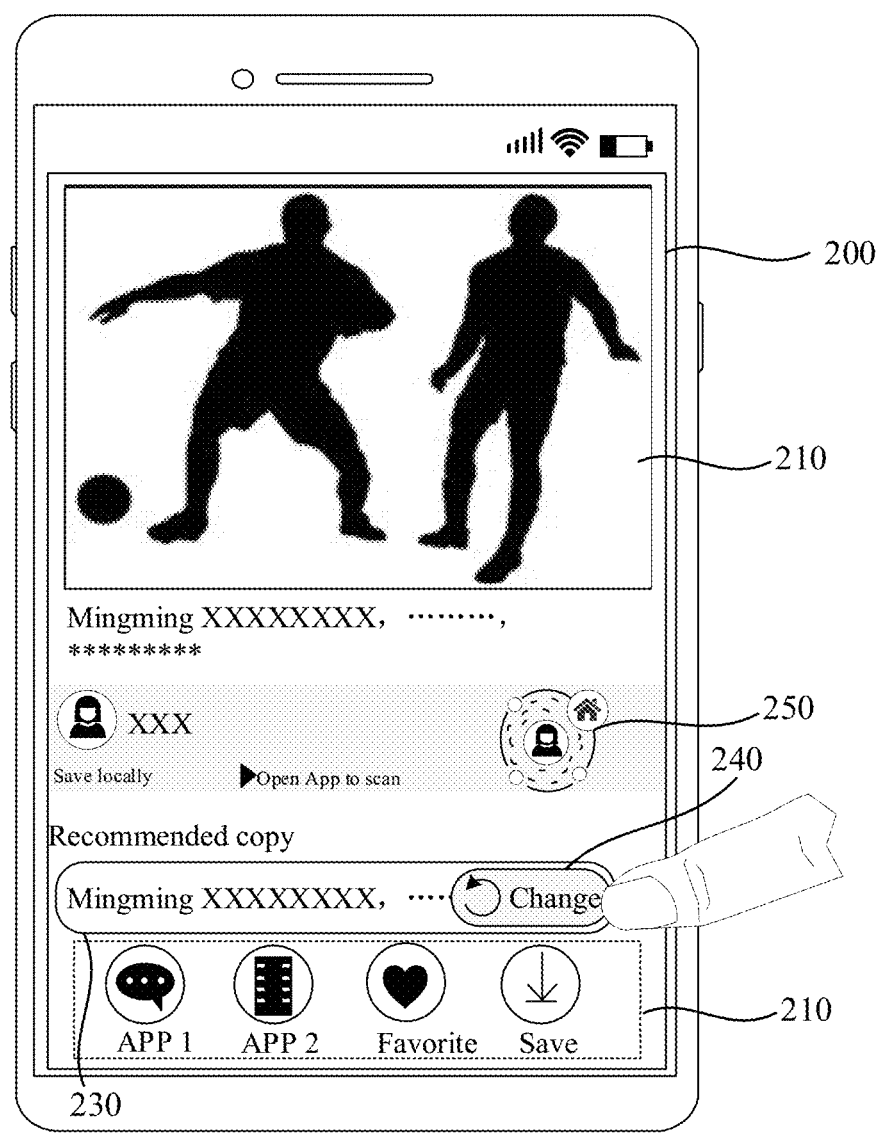
FIG. 11 is a schematic diagram of another display interface provided by the present disclosure.

Specifically, as shown in FIG. 11, the sharing page 200 can also include a copy matching box 230 and a switching control 240.

Figure 12:
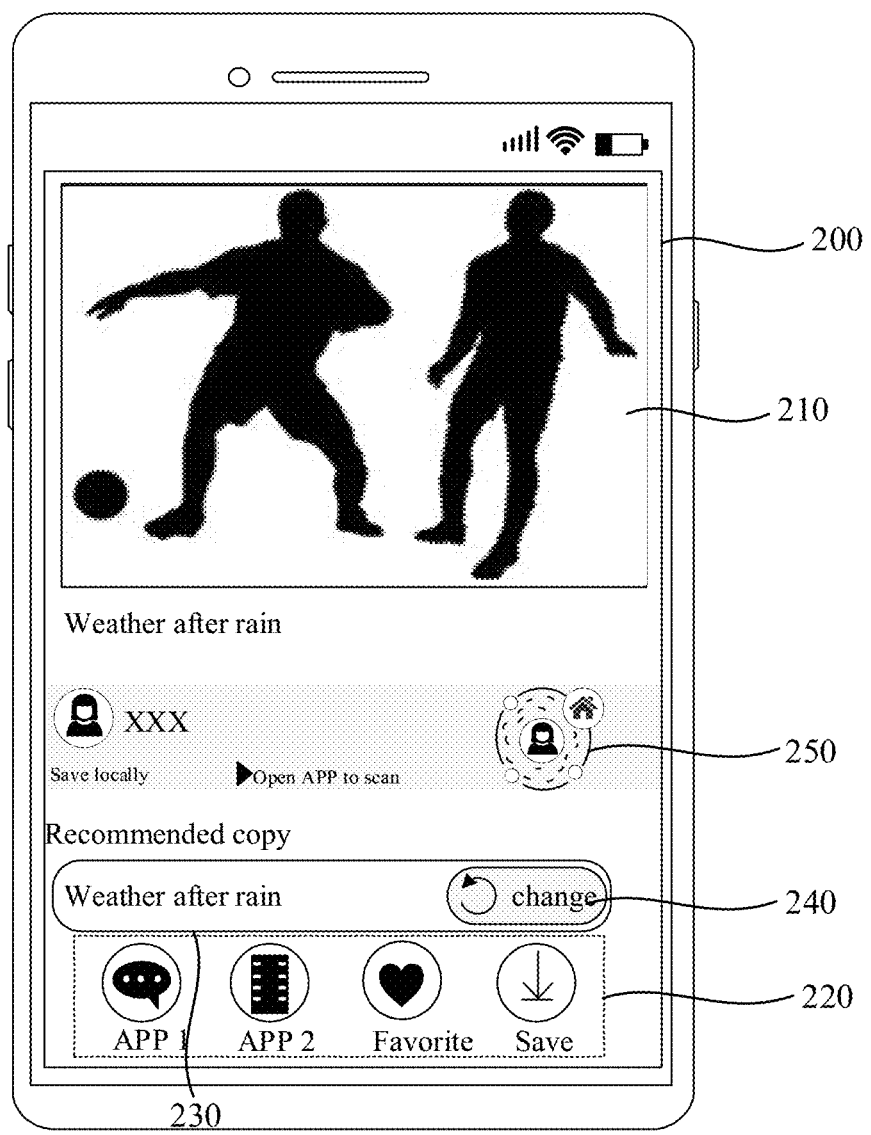
FIG. 12 is a schematic diagram of another display interface provided by the present disclosure.

When the user clicks on the switching control 240 of the sharing page 200, the copy matching box 230 displays the target preset copy updated by the switching control 240, and the target preset copy is displayed at the preset position with respect to the screenshot of the image frame in a preset font at the same time as the copy matching box displays the target preset copy, for example, in FIG. 11, the target preset copy displayed in the copy matching box 230 is "Mingming XXXXXXXX, . . . , * . . . ", and the target preset copy displayed in the copy matching box 230 is displayed right below the screenshot of the image frame, that is, "Mingming XXXXXXXX, . . . , *******", when a user triggers the switching control 240, specifically, the user clicks the switching control corresponding to "change", and the target preset copy displayed in the copy matching box 230 can be changed to "weather after rain", and the target preset copy displayed in the copy matching box 230 is displayed right below the screenshot of the image frame, that is, "weather after rain", as shown in FIG. 12**.

Figure 13:
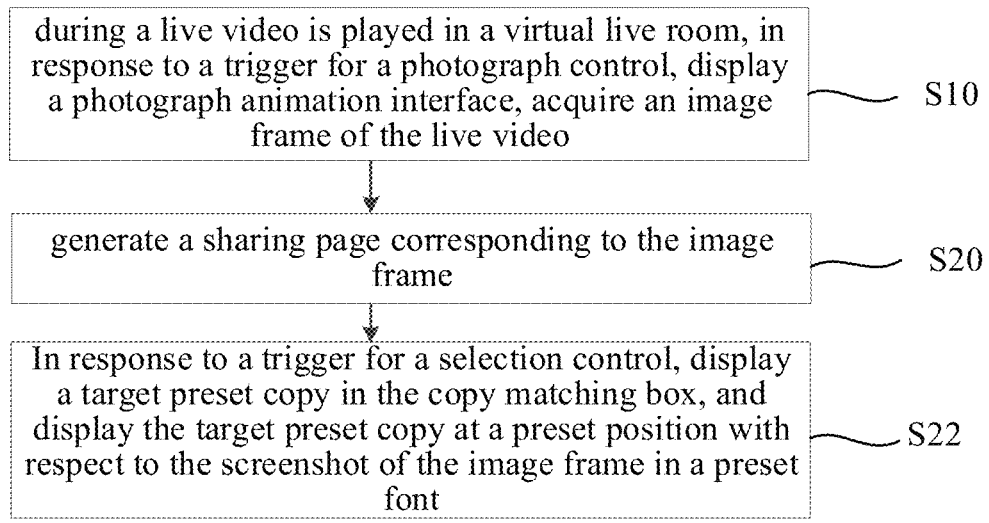
FIG. 13 is flow diagram of yet a live video photographing method provided by the present disclosure.

FIG. 13 is a flow diagram of another live video photographing method provided an embodiment of the present disclosure, on the basis of the above embodiments, as shown in FIG. 13, the live video photographing method further includes:

S22. In response to a trigger for a selection control, displaying a target preset copy in the copy matching box, and displaying the target preset copy at a preset position with respect to the screenshot of the image frame in a preset font.

Figure 14:
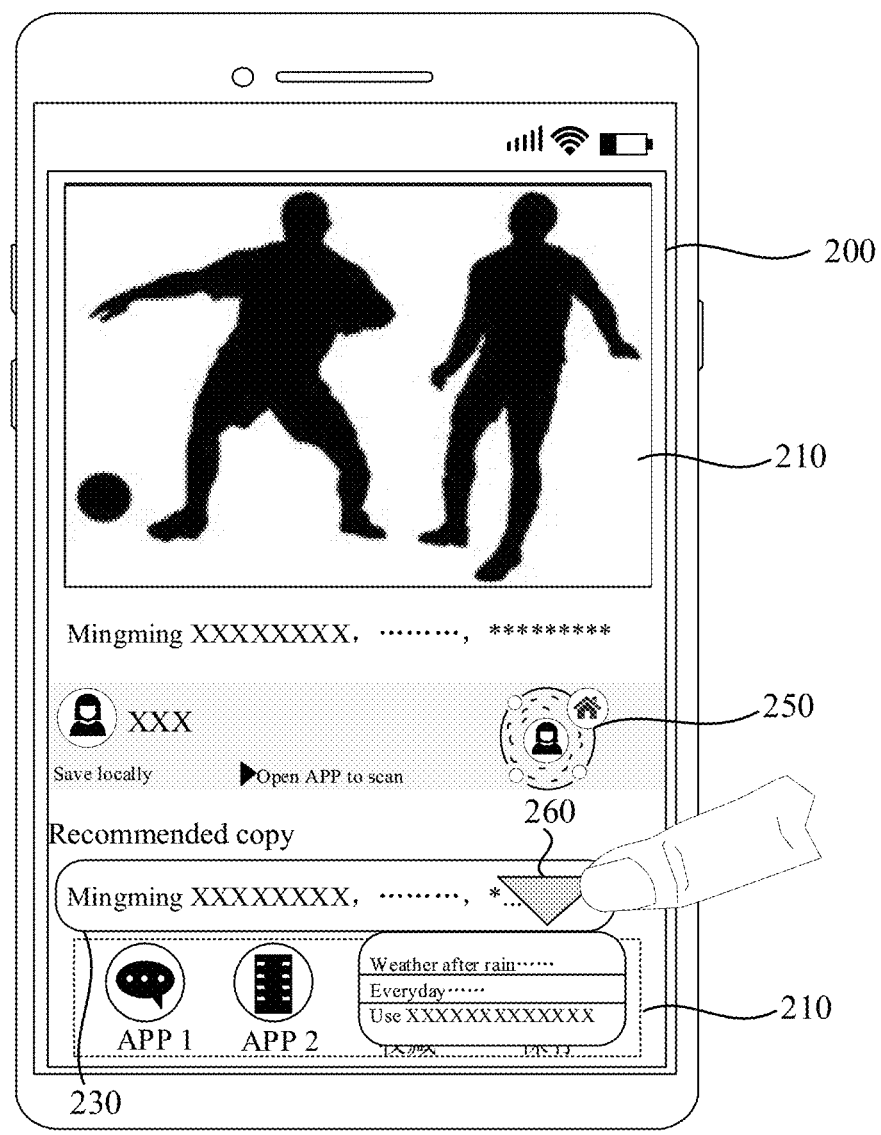
FIG. 14 is a schematic diagram of another display interface provided by the present disclosure.

Specifically, as shown in FIG. 14, the sharing page 200 also includes a copy matching box 230 and a selection control 260.

When the user clicks the selection control 260 in the sharing page 200, the selection control 260 displays a drop-down box, wherein the drop-down box includes target preset copies that the user can select, and at the same time as the copy matching box displays the target preset copy, the target preset copy can be displayed at a preset position with respect to the screenshot of the image frame in a preset font. For example, in FIG. 14, the target preset copy displayed in the copy matching box 230 is "Mingming XXXXXXXX, . . . , * . . . ", the target preset copy displayed in the copy matching box 230 is displayed right below the screenshot of the image frame, when the user clicks the selection control and selects the first copy in the drop-down box "weather after rain", then the target preset copy displayed in the copy matching box 230 is changed to "weather after rain", and the target preset copy displayed in the copy matching box 230 is displayed right below the screenshot of the image frame, that is, "weather after rain", as shown in FIG. 15.

It should be noted that the preset position with respect to the screenshot of the image frame where the target preset copy is displayed in a preset font can be right below or on the screenshot of the image frame, and the preset position where the target preset copy is displayed is not specifically limited in this embodiment of the disclosure. In addition, displaying the target preset copy in the copy matching box can be that the copy corresponding to the live video image frame is acquired after the user triggers the photograph control, or that the user customizedly inputs the copy in the copy matching box, and the embodiment of the present disclosure does not specifically limit the target preset copy displayed in the copy matching box.

In addition, the font of the target preset file can be a user-defined font style, when some fonts cannot match the support, they will be displayed in a system-defined font, and the color, size, etc. of the font can be set by the user.

Figure 15:
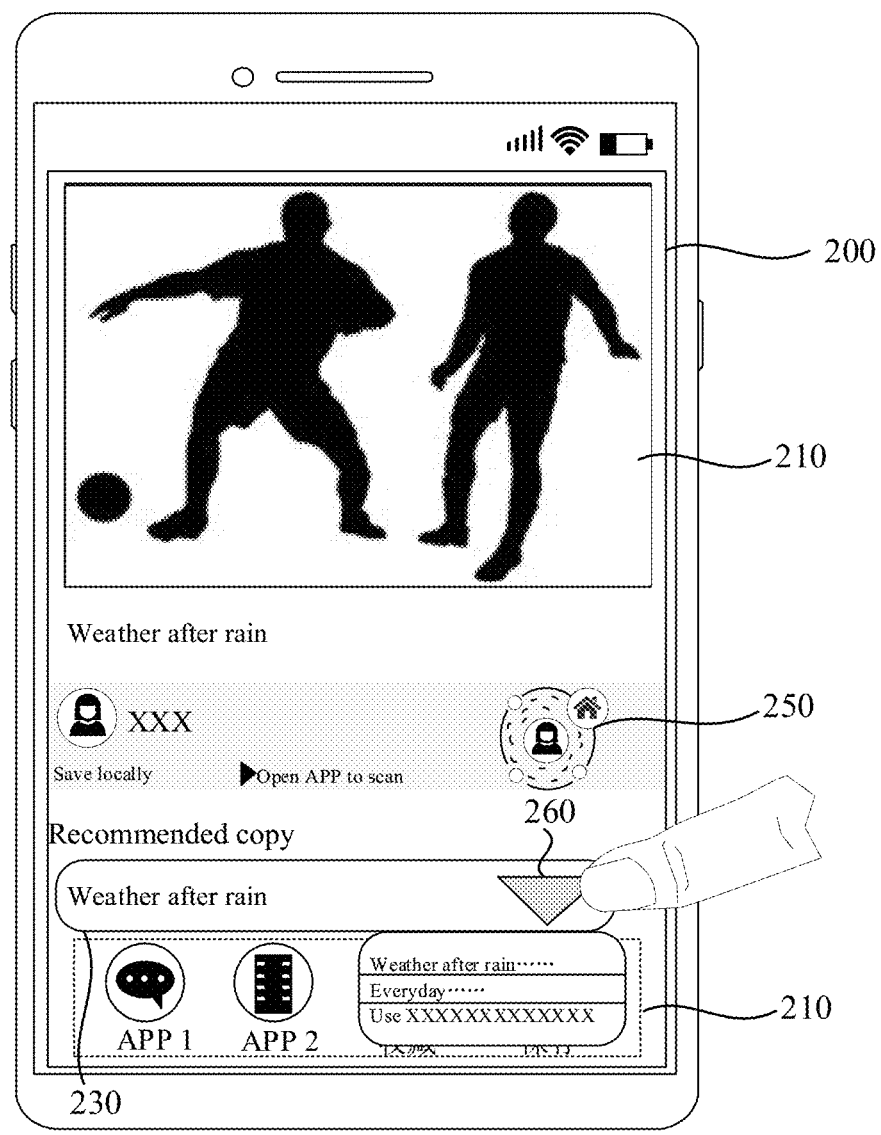
FIG. 15 is a schematic diagram of another display interface provided by the present disclosure.

Optionally, referring to FIG. 14 or FIG. 15, the sharing page can also display a two-dimensional code 250, which may correspond to the virtual live room, so that other users can enter the virtual live room by scanning the two-dimensional code.

As shown in FIG. 14 or FIG. 15, the sharing page 200 can also display a two-dimensional code 250, after during a user plays a live video in a virtual live room, in response to a trigger for a photograph control, an image frame of the live video is acquired, and a sharing page corresponding to the image frame is generated, other users can enter the virtual live room shared by the current user by scanning the two-dimensional code in the sharing page generated by the current user. For example, if the user XXX triggers the photograph control in the XX concert live room, a certain image frame of live video can be acquired, and a sharing page corresponding to the image frame can be generated, and a user can enter the XX concert live room by scanning the two-dimensional code 250 in the sharing page generated by the current user.

In addition, the sharing page can also include the user's head portrait and nickname, that is, the user who generates the sharing page corresponding to the image frame, and the time when the sharing page was generated, for example, yyyy/mm/dd hh: mm.

Figure 16:
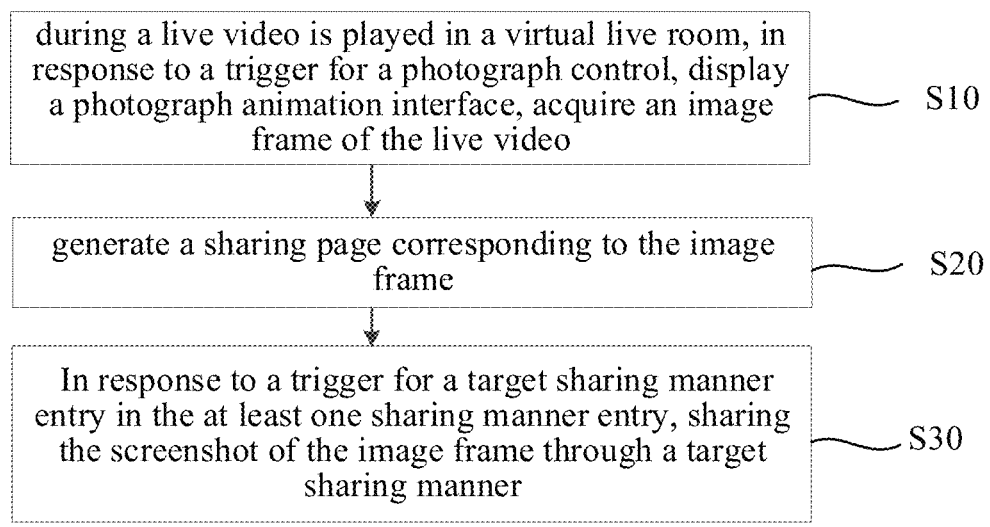
FIG. 16 is flow diagram of still a live video photographing method provided by the present disclosure.

FIG. 16 is a flow diagram of another live video photographing method provided an embodiment of the present disclosure, on the basis of the above embodiments, as shown in FIG. 16, after the step S20, it further includes:

S30. In response to a trigger for a target sharing manner entry in the at least one sharing manner entry, sharing the screenshot of the image frame through a target sharing manner.

Figure 17:
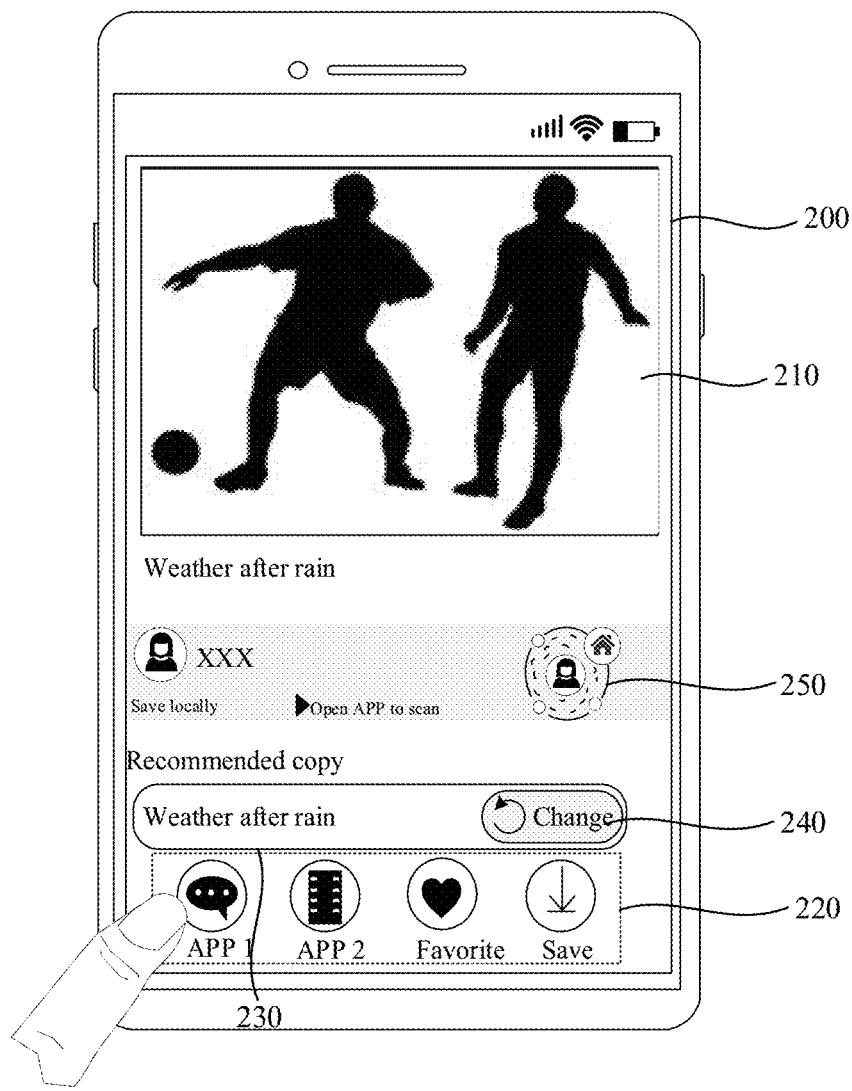
FIG. 17 is a schematic diagram of another display interface provided by the present disclosure.

After during a user plays a live video in a virtual live room, in response to a trigger for a photograph control, an image frame of the live video is acquired, and a sharing page corresponding to the image frame is generated, if the user clicks at least one sharing entry 220 in the sharing page 200, for example, as shown in FIG. 17, the user clicks on the application 1 in the sharing page 200, that is, the application 1 serves as the target sharing manner entry, and in response to the sharing manner triggered by the user, the screenshot of the image frame can be shared through the application 1.

In the live video photographing method provided an embodiment of the present disclosure, by triggering a target sharing manner in at least one sharing manner entry in the sharing page, the screenshot of the image frame can be shared in the target sharing manner, so that the user can share to friends the user-defined live video photographing results, and the initiative of the user sharing/saving the live video photographing results can be improved.

It should be noted that, in the live video photographing method provided the above embodiments of the present disclosure, when the acquired image frame of the live video may correspond to live picture frames that are lived vertically, the live pictures frames with the size of 240*280 can be acquired and configured in the sharing page in a way of left and right spread, middle cropping and up and down. When the acquired image frame of the live video may correspond to live picture frames that are lived horizontally, the live pictures frames can be acquired in a certain proportion, so as to ensure that the acquired image frame of the live video meets the size of the sharing page.

Figure 18:
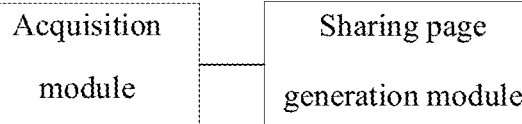
FIG. 18 is a schematic structural diagram of a live video photographing apparatus provided by the present disclosure.

An embodiment of the present disclosure also provides a live video photographing apparatus. As shown in FIG. 18, the live video photographing apparatus may include:
- an acquisition module 310 configured to during a live video is played in a virtual live room, in response to a trigger for a photograph control, display a photograph animation interface, acquire an image frame of the live video,
- a sharing page generation module 320 configured to generate a sharing page corresponding to the image frame, wherein the sharing page includes a screenshot of the image frame and at least one sharing manner entry.

In the live video photographing apparatus provided by the embodiment of the present disclosure, during a live video is played in a virtual live room, in response to a trigger for a photograph control, the acquisition module displays a photograph animation interface, acquires an image frame of the live video, and the sharing page generation module generates a sharing page corresponding to the image frame, wherein the sharing page includes a screenshot of the image frame and at least one sharing manner entry. During a live video is played in a virtual live room, an image frame of the live video is acquired, that is, the acquired image frame of the live video is only the live video picture played in the virtual live room, excluding interactive messages, other elements, etc. in the virtual live room, and the acquired live video picture directly highlights the contents played in the live room, and displaying the photograph animation interface after the photograph control is triggered can improve the user's perception of the photographing process in the virtual live room, enhance the ritual sense of photographing behavior, improve the interest of live interaction, enrich the manners of video photographing in the virtual live room, and directly displaying the sharing page after photographing is convenient for users to share with other users through sharing manners, improve the efficiency and convenience of sharing, and further improve the user's experience.

Optionally, the live video photographing apparatus further includes:
- an interactive interface display trigger module configured to, in response to a trigger for a target interactive button displayed on the live video interface, display an interactive interface, wherein the interactive interface displays the photograph control.

Optionally, when interactive data of the virtual live video meets a preset condition, the photograph control displayed on the interactive interface is in a triggerable state.

Optionally, the photograph control is displayed on the live video interface.

Optionally, the sharing page further includes: a copy matching box and selection control, the live video photographing apparatus further includes:
- a selection control trigger module configured to, in response to the trigger for the selection control, display a target preset copy in the copy matching box, and display the target preset copy at a preset position with respect to the screenshot of the image frame in a preset font.

Optionally, the sharing page also displays a two-dimensional code, which corresponds to the virtual live room, so that other users can enter the virtual live room by scanning the two-dimensional code.

Optionally, the live video photographing apparatus further includes:
- a target sharing manner trigger module configured to respond to a trigger for a target sharing manner entry in the at least one sharing manner entry.
- a sharing module configured to share the screenshot of the image frame through the target sharing manner.

The apparatus of this embodiment can be used to implement the technical solutions of the above-mentioned method embodiments correspondingly, and its implementation principle and technical effect are similar, which will not be described here.

The present disclosure also provides an electronic device, which includes a processor, wherein the processor is used for executing a computer program stored in a memory, and the computer program, when executed by the processor, implements the steps of the above method embodiments.

The present disclosure also provides a computer-readable storage medium, on which a computer program is stored, and the computer program, when executed by the processor, implements the steps of the above method embodiments.

The present disclosure also provides a computer program product, which, when running on a computer, causes the computer to implement the steps of the above method embodiments.

It should be noted that in this paper, relational terms such as "first" and "second" are only used to distinguish one entity or operation from another entity or operation, and do not necessarily require or imply that there is any such actual relationship or order between these entities or operations. Moreover, the terms "including", "comprising" or any other variation thereof are intended to cover non-exclusive inclusion, so that a process, method, article or equipment including a series of elements include not only those elements, but also other elements not explicitly listed or elements inherent to such process, method, article or equipment. Without further restrictions, an element defined by the phrase "including one" does not exclude the existence of other identical elements in the process, method, article or equipment including the element.

What has been described above is only some specific embodiments of the present disclosure, so that those skilled in the art can understand or realize the present disclosure. Many modifications to these embodiments will be obvious to those skilled in the art, and the general principle defined herein can be implemented in other embodiments without departing from the spirit or scope of this disclosure. Therefore, the present disclosure will not be limited to the embodiments described herein, but is to be accorded the widest scope consistent with the principles and novel features disclosed herein.

What is claimed is:

1. A live video processing method, comprising:
   during a live video is played, in response to a trigger for a photograph control, displaying a photograph animation interface, acquiring an image frame of the live video, wherein the photograph control is in a triggerable state in response that interactive data of the live video meets a preset condition, and wherein the image frame of the live video is acquired by intercepting a live video picture that is played corresponding to the trigger for the photograph control, and
   generating a sharing page corresponding to the image frame, wherein the sharing page comprises an image corresponding to the image frame and at least one sharing entry.

2. The method of claim 1, wherein the at least one sharing entry comprises a corresponding sharing manner respectively.

3. The method of claim 1, wherein, before in response to a trigger for a photograph control, displaying a photograph animation interface, acquiring the image frame of the live video, the method further comprises:
   in response to a trigger for a target interactive button displayed on a live video interface, displaying an interactive interface, wherein the interactive interface displays the photograph control.

4. The method of claim 1, wherein, the photograph control is displayed on a live video interface.

5. The method of claim 1, wherein, the sharing page further comprises:
   a copy matching box and selection control;
   the method further comprises:
   in response to a trigger for the selection control, displaying a target preset copy in the copy matching box, and displaying the target preset copy at a preset position with respect to the image corresponding to the image frame in a preset font.

6. The method of claim 1, wherein, the sharing page further comprises:
   a copy matching box and a switching control;
   the method further comprises:
   in response to a trigger for the switching control, switching a target preset copy in the copy matching box, and displaying the target preset copy at a preset position with respect to the image corresponding to the image frame in a preset font.

7. The method of claim 1, wherein, the sharing page also displays a two-dimensional code, which corresponds to a virtual live room, so that other users can enter the virtual live room by scanning the two-dimensional code.

8. The method of claim 1, wherein, after generating the sharing page corresponding to the image frame, the method further comprises:
   in response to a trigger for a target sharing entry in the at least one sharing entry, sharing the image corresponding to the image frame through a target sharing manner corresponding to the target sharing entry.

9. An electronic device comprising: a processor for executing a computer program stored in a memory, wherein the computer program, when executed by the processor, implements:
   during a live video is played, in response to a trigger for a photograph control, displaying a photograph animation interface, acquiring an image frame of the live video, wherein the photograph control is in a triggerable state in response that interactive data of the live video meets a preset condition, and wherein the image frame of the live video is acquired by intercepting a live video picture that is played corresponding to the trigger for the photograph control, and
   generating a sharing page corresponding to the image frame, wherein the sharing page comprises an image corresponding to the image frame and at least one sharing entry.

10. The electronic device of claim 9, wherein, the computer program, when executed by the processor, implements: before in response to a trigger for a photograph control, displaying a photograph animation interface, acquiring an image frame of the live video,
    in response to a trigger for a target interactive button displayed on a live video interface, displaying an interactive interface, wherein the interactive interface displays the photograph control.

11. The electronic device of claim 9, wherein, the photograph control is displayed on a live video interface.

12. A non-transitory computer-readable storage medium having stored thereon a computer program which, when executed by a processor, implements:
    during a live video is played, in response to a trigger for a photograph control, displaying a photograph animation interface, acquiring an image frame of the live video, wherein the photograph control is in a triggerable state in response that interactive data of the live video meets a preset condition, and wherein the image frame of the live video is acquired by intercepting a live video picture that is played corresponding to the trigger for the photograph control, and
    generating a sharing page corresponding to the image frame, wherein the sharing page comprises an image corresponding to the image frame and at least one sharing entry.

13. The non-transitory computer-readable storage medium of claim 12, wherein, the computer program, when executed by the processor, implements: before in response to a trigger for a photograph control, displaying a photograph animation interface, acquiring an image frame of the live video,
    in response to a trigger for a target interactive button displayed on a live video interface, displaying an interactive interface, wherein the interactive interface displays the photograph control.

14. The non-transitory computer-readable storage medium of claim 12, wherein, the photograph control is displayed on a live video interface.

* * * * *